(12) United States Patent
Mayr et al.

(10) Patent No.: US 6,377,734 B1
(45) Date of Patent: Apr. 23, 2002

(54) CABLE NETWORK IN A SYSTEM OF DUCTS AND PIPES HAVING A FLOWING MEDIA AND A METHOD OF SECURING THE NETWORK IN THE SYSTEM

(76) Inventors: Ernst Mayr, Starnberger Wiese 38, 82319 Starnberg (DE); Heinz Diermeier, Melanchthonstr. 6, 81739 Munich (DE); Peter Dotzer, Sibichhauser Str. 8, 82335 Berg (DE)

( * ) Notice: Subject to any disclaimer, the term of this patent is extended or adjusted under 35 U.S.C. 154(b) by 0 days.

(21) Appl. No.: 09/266,528

(22) Filed: Mar. 11, 1999

(30) Foreign Application Priority Data

Mar. 12, 1998 (DE) ......................................... 198 10 824
Oct. 23, 1998 (DE) ......................................... 198 49 039

(51) Int. Cl.⁷ ................................................ G02B 6/44
(52) U.S. Cl. ...................................... 385/100; 385/147
(58) Field of Search ........................... 385/100–113, 147

(56) References Cited

U.S. PATENT DOCUMENTS

| | | | |
|---|---|---|---|
| 4,683,917 A | * 8/1987 | Bartholomew | ............... 138/121 |
| 4,708,427 A | * 11/1987 | Ejiri et al. | ................. 174/70 R |
| 5,173,010 A | 12/1992 | Shimizu | |
| 5,256,002 A | 10/1993 | Shimizu | |
| 5,269,349 A | * 12/1993 | Sugier et al. | ................. 138/172 |
| 5,322,390 A | * 6/1994 | Niimura | ................... 405/136 X |
| 6,119,425 A | * 8/2000 | Shimonohara | ................ 52/439 |

FOREIGN PATENT DOCUMENTS

| | | | | |
|---|---|---|---|---|
| DE | 40 42 159 A1 | | 7/1991 | |
| DE | 297 00 912 | | 4/1997 | |
| DE | 29700912 | * | 4/1997 | ................. 385/100 |
| EP | 0 626 232 A1 | | 5/1994 | |
| JP | 63-265511 | * | 4/1987 | ................. 385/100 |
| JP | 02203302 | | 8/1990 | |
| JP | 04238302 | | 8/1992 | |
| JP | 05272664 | | 10/1993 | |

\* cited by examiner

Primary Examiner—Akm E. Ullah (57) ABSTRACT

A cable network in a duct or pipe system for flowing media has a cable anchored by high-tensile-strength elements between anchoring points in the duct or pipe system. The high-tensile-strength element may be a separate element on which the cable is attached or an element incorporated in the cable sheath. The method includes providing anchoring elements on the interior of the ducts or pipes of the system, and either securing a cable with a high-tensile-strength element to the anchoring elements or securing the high-tensile-strength element to the anchoring elements and then fastening the cable to the tension element.

17 Claims, 6 Drawing Sheets

CABLE NETWORK IN A SYSTEM OF DUCTS AND PIPES HAVING A FLOWING MEDIA AND A METHOD OF SECURING THE NETWORK IN THE SYSTEM

BACKGROUND OF THE INVENTION

The invention relates to a method for securing cables in a duct or pipe system for flowing media, such as gas, waste water, rain water or mixed water.

German Gebrauchsmuster DE 297 00 912 has disclosed a fiber-optic cable network which is introduced in an inaccessible duct or pipe system. The fiber-optic cable used for this system is fixed using resilient securing elements, for example, the fiber-optic cable being arranged between the wall and the securing element. Appropriate robots are required for the securing or for the introduction of the securing elements in inaccessible duct or pipe systems, which robots, under remote control, set down the securing elements at appropriate distances and thus fix the introduced fiber-optic cable.

SUMMARY OF THE INVENTION

A first object of the invention is to provide a method which enables the laying of a cable or other elongate hollow section in a duct or pipe system in a simple manner. This object is achieved with a method comprising the steps of providing a duct or pipe system with at least two accessible locations, and either tensioning a cable with at least one high-tension-strength element between two accessible locations or tensioning a high-tensile-strength element between the two accessible locations and then attaching the cable to the high-tension-strength element.

Furthermore, the invention is based on a second object, which consists in designing a cable network for a duct or pipe system which can be installed by the method according to the invention. This object is achieved by means of a cable network comprising a duct or pipe system having spaced anchoring points and a cable is either fixed to at least one high-tensile-strength element which is attached by securing the element to the anchoring points at appropriate distances or includes the high-tensile-strength element and is anchored in the system to the spaced anchoring points.

By comparison with the known prior art, the method according to the invention and the cable network according to the invention afford considerable advantages, which are primarily manifested in simple and short mounting, the means required for this purpose likewise being simple and extremely cost-effective. Further advantages may be seen in the fact that in the method according to the invention, the duct or the pipe can hardly be blocked up by the introduced cable since there are no deposit points for contaminants to be found within the duct or pipe. The mounting of a cable by anchoring is generally already known from overhead cable technology, so the aids which are essentially familiar in that technology can also be employed in the context of mounting within a duct or pipe system. As is shown, however, there is a need for intensive considerations to use such a laying system in a duct or pipe system, since only relatively complicated mounting methods have been used to date. Thus, in inaccessible duct or pipe systems, robot vehicles have been necessary to date in order to secure the subsequently inserted cables in such a way that they do not constitute an obstacle. It is advantageous, moreover, that the method according to the invention can be used for any type of ducts or pipes made of metal, stoneware or plastic, since the securing for a high-tensile-strength element is performed in each case at the anchoring points which are each arranged at the access locations of the duct or pipe network. It is also advantageous that during duct repairs, for example, the cables or hollow sections can be removed from the duct with extremely little effort, thereby enabling the repair to be carried out without difficulties. Afterwards, the installation is just as simple as during the original laying.

In the case of the method according to the invention, firstly, the cable or the hollow section is pulled in or pushed in. Afterwards, the anchoring points are secured on the shaft walls or shaft outlets of the duct or pipe system. In the simplest case, according to the invention, a high-tensile-strength element, for example a tension cable known per se, such as a steel cable, is suspended from the anchoring points and correspondingly anchored by means of a turnbuckle. Any desired cable or elongate hollow section can then be attached to such a high-tensile-strength element using suitable securing means, for example using clamps or restraint coils. Since the high-tensile-strength element with the attached cable or hollow section is hung in each case in the upper region of the duct or pipe, it does not interfere with the flow of the flowing media, such as gas, waste water, rain water or mixed water, with the result that no deposits can form. In addition, it is still possible to use robots, without any obstructions, for example in order to inspect the duct system. The possible anchoring length of such a high-tensile-strength element with attached cable or hollow section depends in each case on the duct routing and the permissible anchoring force of the high-tensile-strength element. In addition, the high-tensile-strength element can also be additionally fixed in intermediate shafts with the aid of supporting coils or deflection rollers, thereby enabling longer anchoring lengths.

In the case of this method according to the invention, however, it is also possible to use high-tensile-strength cables in which high-tensile-strength elements are already incorporated in the cable structure, in particular in the cable sheath, or in the hollow section, or are secured at the surface. The laying procedure is even simpler in the case of this variant since the high-tensile-strength element already forms a unit with the cable or hollow section, with the result that only one laying operation is required. At the anchoring points, the high-tensile-strength element is then respectively removed from the cable structure or the hollow section and fixed to the anchoring points for anchoring purposes. Anchoring coils can also be wound onto the respective cable, which coils are then suspended from the respective anchoring point. A turnbuckle is then additionally interposed at the other end of the cable or hollow section, the requisite anchoring ultimately being effected by the turnbuckle.

Depending on the method, it is possible to use any desired types of cables for this kind of laying, such as microcables which comprise a thin tube and optical waveguides loosely introduced therein. It is also possible to use dielectric cables, for example an "all dielectric self supportly cable" (ADSS) having a rodent-proof sheath or else a so-called TOP cable, which is provided with a glass-fiber-reinforced plastic sheath over the cable core. Further types of cables are specified in connection with the description of the Figures.

The present invention is furthermore based on the object or reducing the sag between two anchoring locations in the case of anchored cables or elongate hollow sections within a duct or pipe system. This object that has been set is achieved with a method of the type explained in the introduction by virtue of the fact that at least one contact-pressure means is inserted in the region between two anchoring points within the duct or pipe system, and that the hightensile-strength element with an attached cable or a cable with at least one high-tensile-strength element or an elongate hollow section with at least on high-tensile-strength element is subsequently pressed against the inner wall of the duct or pipe system as a result of expansion of the contact-pressure means.

As is already known, high-tensile-strength elements with an attached cable, cables with at least one integrated high-tensile-strength element or an elongate hollow section with a high-tensile-strength element are tensioned between entry shafts in duct or pipe systems. If there are very long anchored lengths or if the course of the duct or pipe system is not straight, an increased sag is possible in the central region, which sag means that problems may possibly occur during the customary cleaning processes or during duct operation. According to the invention, then, an expandable or spreadable contact-pressure means is introduced in the region of the largest sag, where it is finally expanded or spread open. As a result, the introduced high-tensile-strength element with attached cable, the cable with an integrated high-tensile-strength element or a hollow section with a high-tensile-strength element is pressed against the inner wall of the duct or pipe system, so that, by this means, there is no longer any sag. As a result of the long anchored length being divided into two partial regions, the sag established in the partial regions is considerably reduced, with the result that it is not necessary to expect nay disruption in duct operation. The contact-pressure means that is used according to the invention is, for example, a plastic hose which, if required, is reinforced with glass fibers and is generally referred to as a "part-liner". This plastic hose is preferably coated or impregnated with a curable adhesive, with the result that it can be fixed on the inner wall of the duct or pipe system after being expanded or spread open. Such a part-liner is pushed, for example, onto a rubber sac and, with the aid of a robot, is taken to the intended location, usually the middle of an anchored length. At that point, the sac is inflated with air or a propellant gas, with the result that the part-liner is pressed onto the inner wall, where it already sticks by virtue of the adhesive. Once the part-liner has been pressed onto the inner wall, the sac is moved again and, depending on the type of adhesive, the adhesive is cured with the aid of UV or infrared irradiation or with hot air.

It is also possible to use contact-pressure means in the form of spreadable or expandable rings made of plastic or steel, in particular stainless steel. Such contact-pressure means can be used separately by themselves or else in connection with a hose-like part-liner if, for example, the supporting force of the part-liner is to be reinforced. In such a case, firstly, the contact-pressure means in the form of the ring will be installed by spreading or expansion and then the hose-like part-liner will be mounted over it in the manner already described. Suitable adhesives for the part-liner are the materials which are generally suitable for such applications and must be, in particular, resistant to water and chemicals. Thus, the use of two-component adhesives is also entirely possible.

Other advantages and features of the invention will be readily apparent from the following description of the preferred embodiments, the drawings and claims.

DESCRIPTION OF THE PREFERRED EMBODIMENTS

Figure 1:
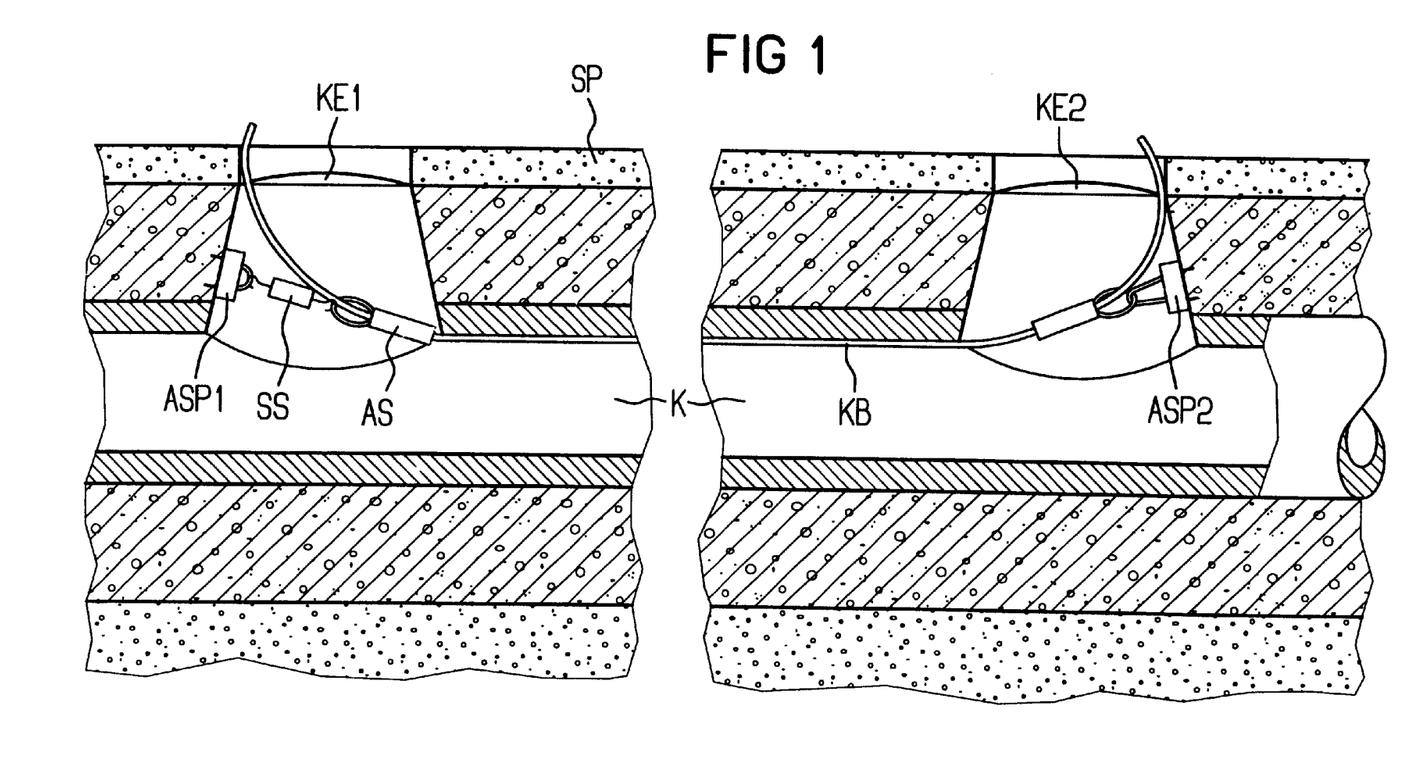
FIG. 1 is a longitudinal cross sectional view of a cable network according to the invention, in which a high-tensile-strength cable is pulled in and anchored.
Figure 6:
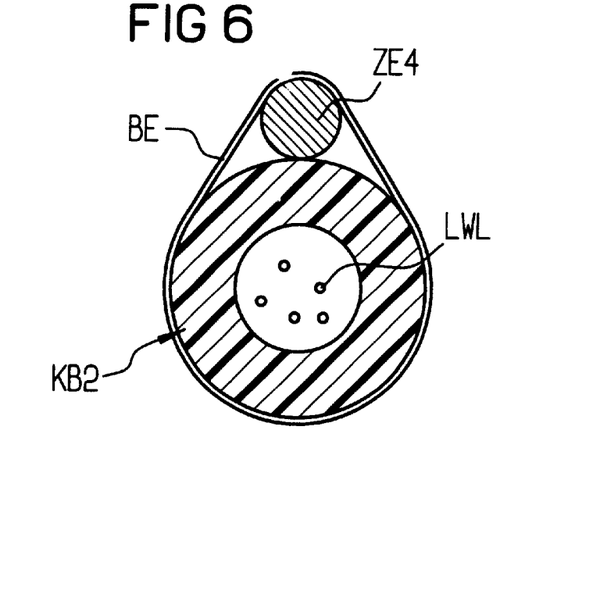
FIG. 6 is a cross sectional view of the securing of a fiber-optic cable on a separate high-tensile-strength element.

FIG. 1 shows an anchored cable KB, which is pulled in and anchored within a duct or pipe system K. In the case of this exemplary embodiment, the cable KB is one which itself has high-tensile-strength elements integrated in it. An anchoring zone extends generally from an accessible duct inlet location KE1 to a second duct inlet location KE2, which are generally designed as entry shafts. Anchored on the walls of these duct inlet locations KE1 and KE2 are anchoring points ASP1 and ASP2, respectively, to which at least one high-tensile-strength element of the cable is secured, an anchoring coil AS or similar retainer being arranged in each case at the exit location of the cable. At one end of the anchoring zone, this anchoring coils AS is attached directly to the anchoring point ASP2, while the second anchoring coils AS is suspended by a turnbuckle SS. The turnbuckle SS is then suspended from the anchoring point ASP1 by its second end and serves to anchor the cable KB and the high-tensile-strength element incorporated therein, which is not illustrated here for the sake of clarity. The cable KB itself is then routed further, for example to a corresponding outlet, a service connection or the like. A similar configuration is produced if a separate high-tensile-strength element is anchored within the duct or pipe system K, in which case, however, the corresponding cable is then attached with securing means, as illustrated in FIG. 6, for example. In this case, a high-tensile-strength cable is not necessary. In other words, any type of cable can be used when a separate high-tensile-strength element is used, as will be demonstrated later in subsequent drawings using examples. FIG. 1 clearly reveals that by and large the free space of the duct or pipe system remains free of securing units for cables that have been required previously in the prior art. The duct or pipe system can be arranged in any desired foundation, for example underneath a street section SP, the inlet and outlet locations also being utilized for leading the cables in and out. It is a major advantage, moreover, that a plurality of cables can be routed in parallel, it even being the case, under certain circumstances, that a plurality of cables can be routed in parallel, it even being the case, under certain circumstances, that the high-tensile-strength element can be utilized for a plurality of cables. The same principles of the invention apply when hollow sections with or without high-tensile-strength elements are pulled in, so further sketches or descriptions are unnecessary.

Figure 2:
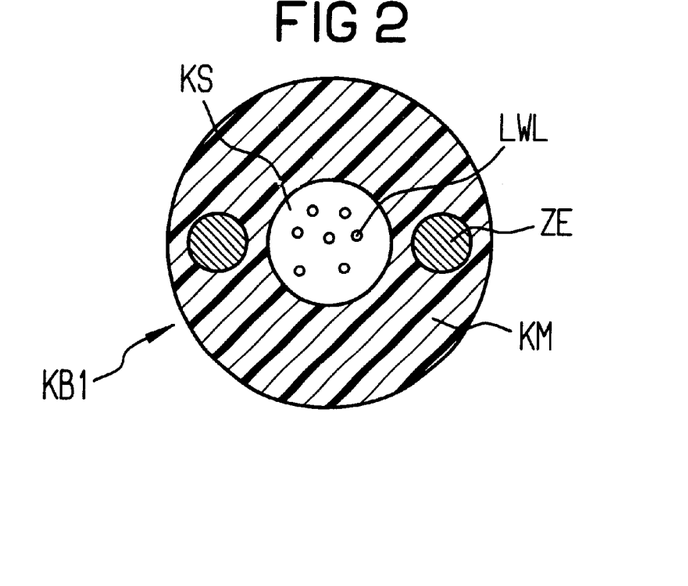
FIG. 2 is a cross sectional view of a high-tensile-strength fiber-optic cable with high-tensile-strength elements incorporated therein.

FIG. 2 shows a fiber-optic cable KB1, in which two longitudinal high-tensile-strength elements ZE are integrated in the cable sheath KM so that they are already situated oppositely. The cable core KS contains, for example, optical waveguides LWL or else copper conductors or a combination of both. Consequently, this cable KB1 does not require an additional high-tensile-strength element, since the anchoring can be performed by means of the integrated high-tensile-strength elements ZE.

Figure 3:
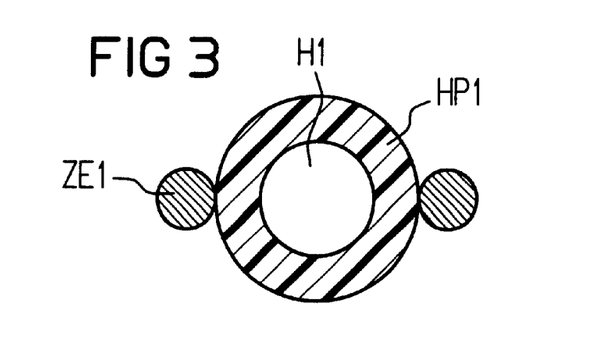
FIG. 3 is a cross sectional view of an elongate hollow section with high-tensile-strength elements lying on the outside.

FIG. 3 shows that the laying method can also be utilized for elongate hollow sections HP1, in this case high-tensile-strength elements ZE1 being arranged longitudinally in an adhering manner along the hollow section HP1. The anchoring to the anchoring points is once again effected by means of these high-tensile-strength elements ZE1. Electrical conductors, optical waveguides, optical-waveguide strips, electrical cables, dielectric cables or else, especially, microcables can now subsequently be introduced as desired into the cavity H1 of the hollow section HP1.

Figure 4:
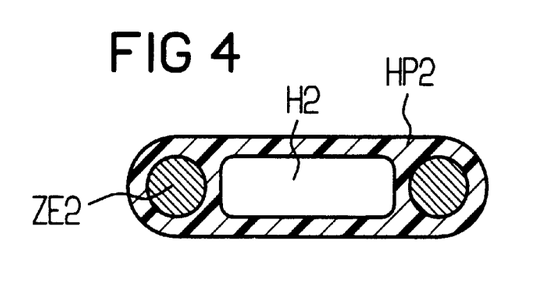
FIG. 4 is a cross sectional view of an oval hollow section with high-tensile-strength elements incorporated therein.

FIG. 4 shows a planar or oval hollow section HP2, which, longitudinally, has a correspondingly shaped cavity H2 into which, once again, the corresponding conductors or cables of any desired type can be pulled. The anchoring within the duct or pipe system is once again effected by means of two longitudinal integrated high-tensile-strength elements ZE2.

Figure 5:
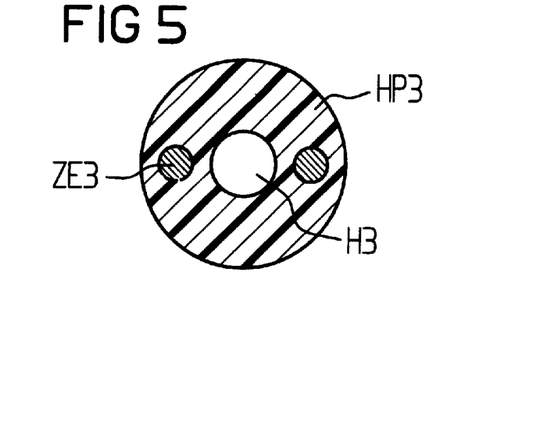
FIG. 5 is a cross sectional view of an elongate hollow section having a round cross section.

FIG. 5 shows a hollow section HP3 having a circular cross section into whose longitudinal cavity H3 conductors or cables can be inserted as desired. The anchoring is once again performed by means of the high-tensile-strength elements ZE3 embedded in the hollow section 4P3.

FIG. 6 then shows the example for the laying of a cable which does not have any high-tensile-strength elements, this example having been indicated in the course of the description with reference to FIG. 1. Any desired conductors, such as optical waveguides LWL in this exemplary embodiment, for example, can be routed inside such a cable KB2. In this exemplary embodiment, the anchoring within the duct or pipe system is then effected not by means of elements of the cable KB2, but by means of a separate high-tensile-strength element ZE4, which is gripped at the anchoring points and is anchored by means of a turnbuckle. The cable KB2 is then attached to this anchored high-tensile-strength element ZE4 and fixed with the aid of securing means BE. Consequently, the simple method according to the invention can also be used in the case of cables or else in the case of hollow sections without high-tensile-strength elements.

Figure 7:
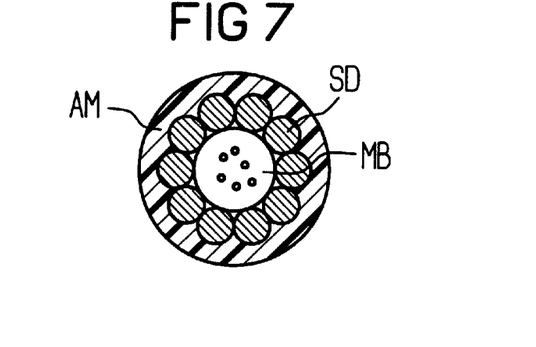
FIG. 7 is a cross sectional view of a submarine micro-cable.

FIG. 7 shows in an example that it is also possible to use a submarine microcable. Maxibundles MB having optical fibers are contained inside the microcable. The maxibundles may be composed of metal or of plastic. Arranged over them are stranded steel wires SD, which are used for anchoring to the anchoring points in the course of anchoring by the method according to the invention. Extending over the wires SD is an outer sheath AM composed of polyethylene, for example.

Figure 8:
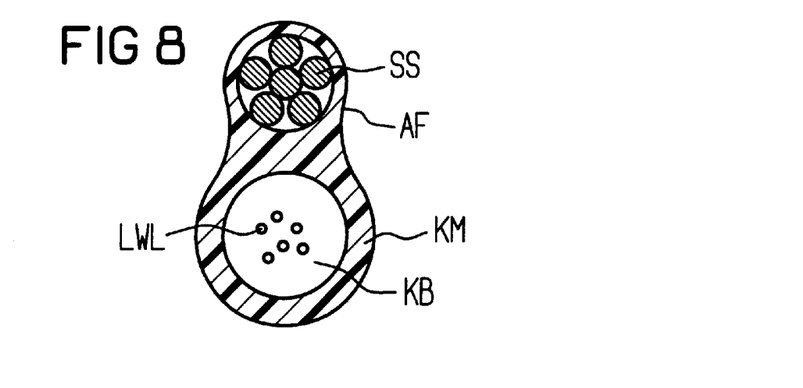
FIG. 8 is a cross sectional view of a high-tensile-strength overhead cable.

FIG. 8 shows a so-called sheath-only cable, for example a "FIG. 8 cable". This involves a combination of any desired cable KB and a steel cable SS, which, situated one above the other, are surrounded by a common plastic sheath KM, it also being possible for the high-tensile-strength element SS to extend in a recess AF in the cable sheath KM. In this case, the steel cable SS serves for anchoring within the duct or pipe system by the method according to the invention. The cable that is used may also be, for example, a microcable, comprising a tube and optical waveguides LWL loosely introduced therein. If a metallically-conducting tube is involved, this may, for example, be concomitantly used as a current lead as well. Rodent-protected cables are also especially suitable for use in a duct or pipe system.

Figure 9:
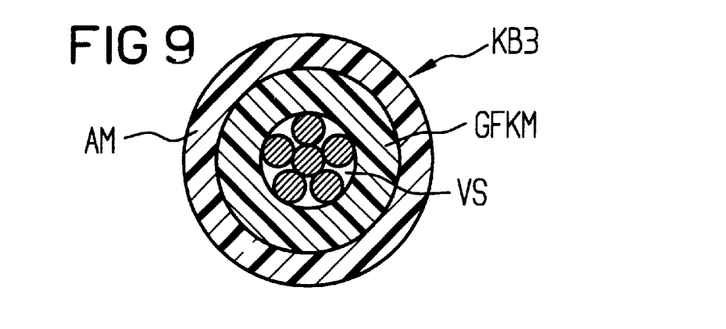
FIG. 9 is a cross sectional view of a TOP cable with a glass-fiber-reinforced plastic sheath.

FIG. 9 shows an optical overhead cable KB3 with a tubular supporting element (TOP cable) which can likewise be laid and anchored by the method according to the invention. This cable KB3 is anchored as a whole, since it contains a high-tensile-strength glass-fiber-reinforced plastic sheath GFKM. Inside the latter, there is either a stranded cable core VS or a maxibundle of optical waveguides. The entire system is surrounded by an outer sheath AM.

Figure 10:
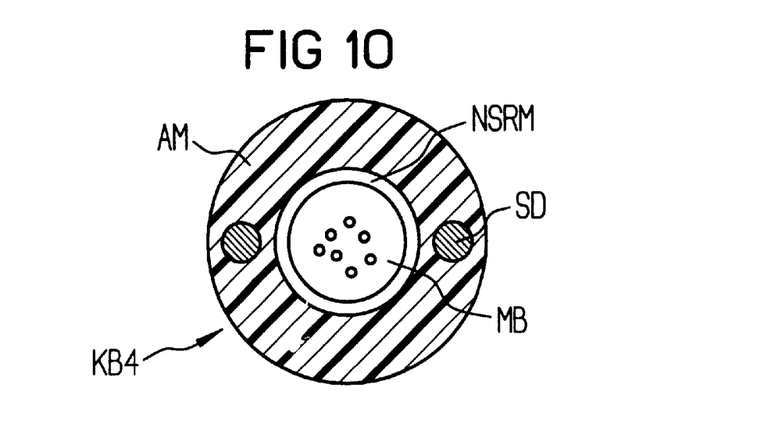
FIG. 10 is a cross sectional view of an OWK cable with two high-tensile-strength elements situated oppositely in the cable sheath.

FIG. 10 additionally shows a so-called OWK cable, which has incorporated in its outer sheath AM, situated oppositely, high-tensile-strength elements in the form of steel wires SD. The core of this cable KB4 contains a stranded cable core or a maxibundle MB of optical waveguides, surrounded by a rodent-proof grooved sheath NSRM.

In addition to these exemplary embodiments of cables mentioned, by and large further embodiments are suitable which, in principle, can withstand the requirements with respect to the conditions prevailing in a duct and pipe system.

Figure 11:
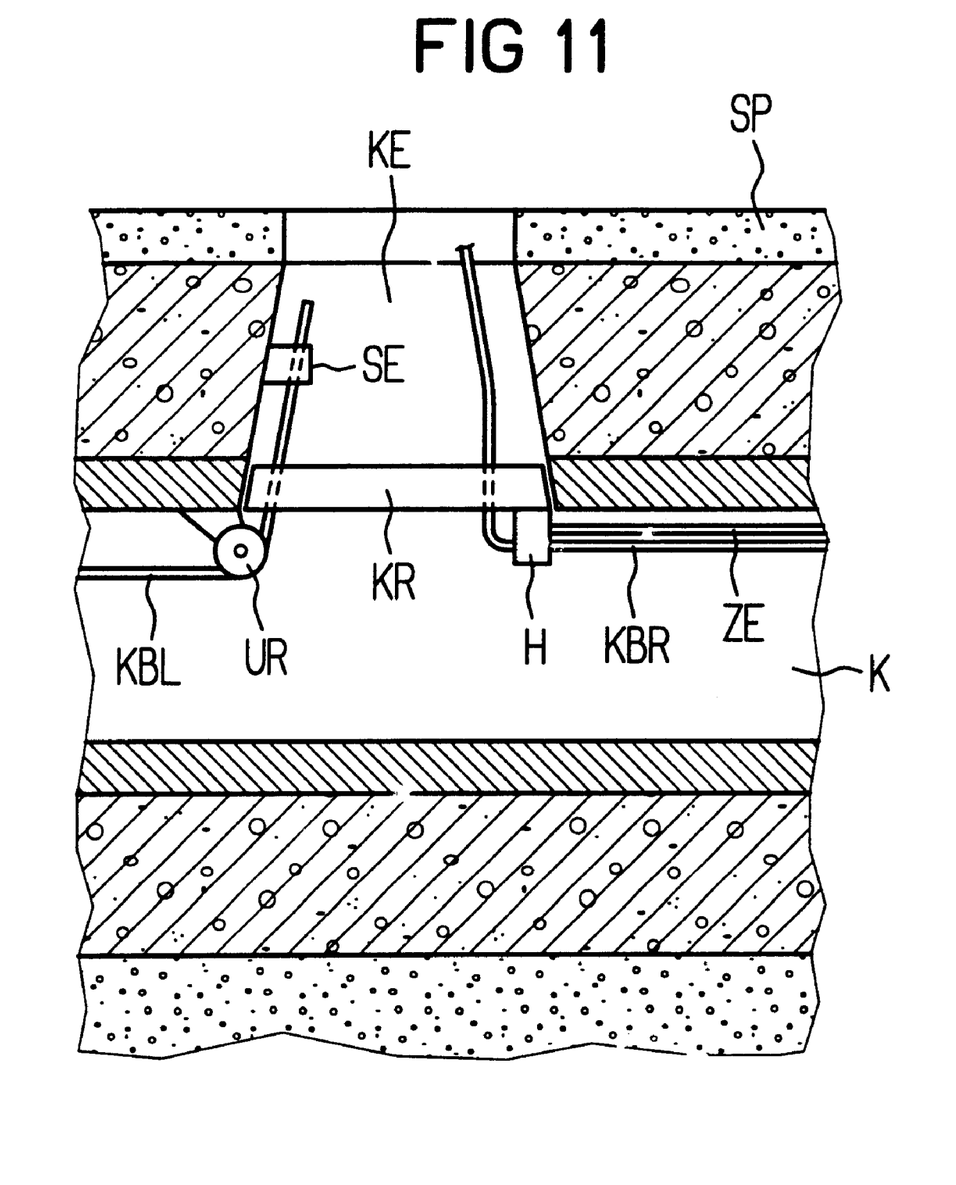
FIG. 11 is a cross sectional view showing two securing variants for the anchoring of high-tensile-strength elements.

The anchoring points used for the high-tensile-strength elements may be, for example, hooks, ring eyes or similar securing elements, which are pegged or driven, for example, into the inlet or entry locations of the duct or pipe system. FIG. 11 shows two other variants for the securing of the high-tensile-strength elements, it being irrelevant whether the respective high-tensile-strength element is arranged in the cable or whether an independent element is used. Thus, a spreading apparatus, for example a spreading ring or clamping ring KR, can also be clamped in the entry location of the duct or pipe system by being spread open, so that the entry shaft is not damaged during the securing operation. Arranged on this clamping ring KR is at least one retainer H, which projects into the duct or the pipe in order to be able to ensure free anchoring of the high-tensile-strength element ZE. In the case of the anchoring variant in the right-hand part of FIG. 11, a cable KBR without any high-tensile-strength elements is used, for example, with the result that a separate high-tensile-strength element ZE is anchored on the retainer H, to which element the cable KBR is attached. The cable KBR is directed further into the inlet location KE.

The left-hand side of FIG. 11 shows a variant in which the cable KBL is routed up by a deflection roller UR into the inlet location, where the high-tensile-strength element, for example of the cable, is then secured to the anchoring point by means of a tensioning unit SE.

In all of the exemplary embodiments according to the invention, it is also possible for a plurality of anchoring units of cables and/or high-tensile-strength elements to be arranged so that they run parallel. When an electrically-conductive, separate, high-tensile-strength is used, this could be used as a current collector for robots which are used for service purposes.

In all of the exemplary embodiments according to the invention, it is also possible for receptacles for excess cable and/or optical waveguide lengths to be arranged at the inlet locations, for example in the clamping rings, which are then provided with corresponding guides and retainers.

Figure 12:
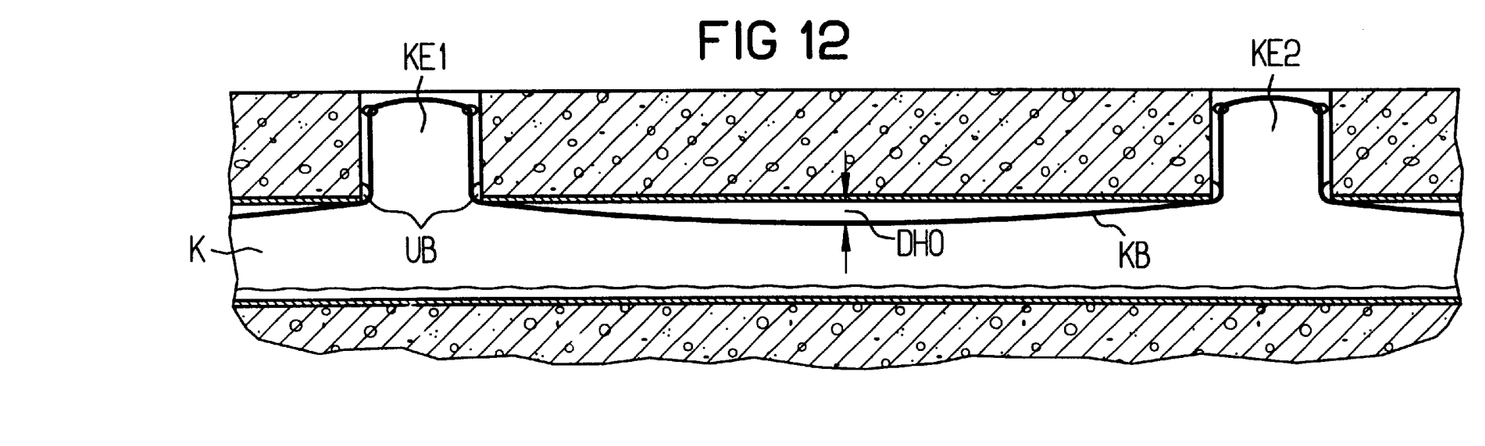
FIG. 12 is a cross sectional view of a prior art system.

FIG. 12 shows a cable KB, which may be either a high-tensile-strength element with an attached cable, a cable with an integrated high-tensile-strength or a hollow section with a high-tensile-strength element, and the cable KB is anchored in a duct or pipe system K, for example for gas, waste water, rain water or mixed water, between two duct inlet locations KE1 and KE2. It is indicated in this case that the cable KB is fixed in the inlet locations KE1 and KE2 and is inserted via deflection arches UB in each case into the duct or pipe system K and anchored. A sag with an arcuate profile known per se is ineluctably produced in this case, the largest sag DHO being established in the center in the case of free routing. This sag DHO can be disruptive for normal duct or pipe system operation, since, for example, cleaning apparatuses may bump into it or refuse may accumulate to the point of blockage.

Figure 13:
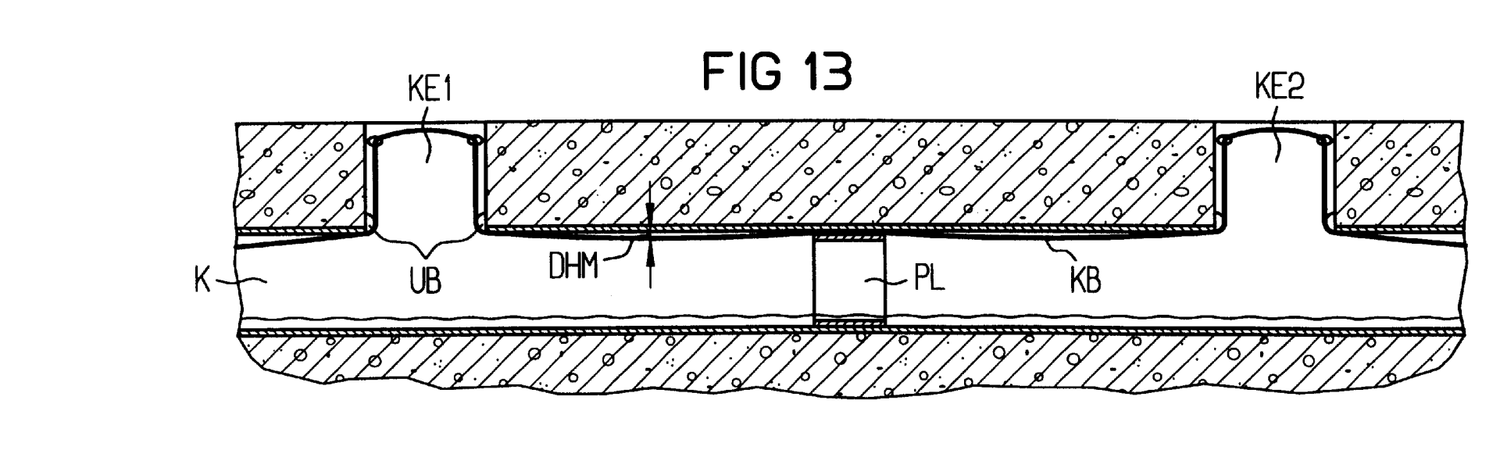
FIG. 13 is a cross sectional view showing the use of a contact-pressure means according to the invention in the central region of an anchored length.

FIG. 13 demonstrates the effect of the present invention and a solution to the above problem. In order to avoid the interfering sag, a contact-pressure means is inserted at the duct or pipe system K in the region of the large sag, which means presses the cable KB against the inner wall of the duct or pipe system. The consequence of this is that the originally large sag is divided into smaller sags DHM, which are then each established in the center of the partitioned regions or anchored lengths. It may be assumed in this case that given the same cable KB, the same anchoring force and the same total anchored length, the sags DHM established in the partial regions amount to approximately only ¼ of the original sag DHO when a contact-pressure means is arranged centrally in the total anchored length. To support the cable KB, for example, a so-called part-liner PL is inserted and expanded, as has already been described above in the general part. In the case of long anchored lengths, it is also possible to implement a plurality of supports with part-liners PL or with the aid of expandable or spreadable rings. In this case, the number of such supports depends essentially on the cable KB used, the anchoring force and the length of the total anchored region, the contact-pressure means in each case being inserted and installed using correspondingly suitable robots in the manner already described. It is not shown here that, in addition, it is also possible to insert spreadable or expandable plastic or steel rings which are then expediently covered by subsequently inserted part-liners of the type described. These additional supports are necessary, for example, when particularly heavy cables or high-tensile strength elements are used.

Although various minor modifications may be suggested by those versed in the art, it should be understood that we wish to embody within the scope of the patent granted hereon all such modifications as reasonably and properly come within the scope of our contribution to the art.

We claim:

1. A communication cable network in a system having ducts and pipes for flowing media, said network comprising anchoring elements at spaced anchoring points in the ducts and pipes of the system, means for securing a high-tensile-strength element to the anchoring elements, and means for fixing a communication cable to the high-tensile-strength element so that the communication cable extends through the ducts and pipes of the system.

2. A communication cable network in a system of pipes and ducts for flowing media, said network comprising a communication cable having an elongated hollow section with at least one high-tensile-strength element secured thereto, anchoring elements being spaced along an interior of the pipes and ducts to form anchoring points, said high-tensile-strength element being secured to the anchoring points by means of the anchoring elements so that the communication cable with the high-tensile-strength element extends through the pipes and ducts of the system.

3. A cable network according to claim 2, wherein a cable is introduced within the elongate hollow section.

4. A cable network according to claim 2, wherein fiber-optic cables, microcables, comprising a small tube and optical waveguides introduced loosely therein, optical-waveguide maxibundles, optical-waveguide strips or electrical cables are arranged in the hollow section.

5. A cable network according to claim 2, wherein at least one high-tensile-strength element is arranged within the cable.

6. A cable network according to claim 2, wherein at least one high-tensile-strength element is arranged outside the cable.

7. A cable network according to claim 2, wherein at least one high-tensile-strength element is arranged in a recess in the cable.

8. A cable network according to claim 2, wherein the cable has a round cross section.

9. A cable network according to claim 2, wherein the cable has a planar or oval cross section.

10. A cable network according to claim 2, wherein a plurality of anchoring units are arranged so that they run parallel.

11. A cable network according to claim 3, wherein the anchoring elements are pegged onto or driven into the anchoring points.

12. A cable network according to claim 2, wherein the anchoring elements are secured on a spreading element, the spreading element being arranged in an inlet location of the system.

13. A cable network according to claim 2, wherein a receptacle for excess cable and/or optical waveguide lengths is arranged in the inlet location, for example within a clamping ring.

14. A cable network according to claim 1, which includes a contact-pressure means being arranged between the anchoring points within the system which can be spread or pressed against the inner wall in such a way that the cable is additionally fixed.

15. A cable network according to claim 14, wherein the contact-pressure means is an expandable and is a glass-fiber-reinforced plastic hose which is provided with an adhesive.

16. A cable network according to claim 14, wherein the contact-pressure means is designed as an expandable ring.

17. A cable network according to claim 14, wherein a removable inflatable sac is arranged within the contact-pressure means in order to spread open the latter and press it on the wall.

\* \* \* \* \*